(12) United States Patent
Channabasappa et al.

(10) Patent No.: US 8,848,526 B1
(45) Date of Patent: Sep. 30, 2014

(54) NETWORK PROCESSOR WITH TRAFFIC SHAPING RESPONSE BUS INTERFACE

(75) Inventors: Shankar Channabasappa, San Jose, CA (US); Amit Arora, Campbell, CA (US)

(73) Assignee: NetLogic Microsystems, Inc., Irvine, CA (US)

( * ) Notice: Subject to any disclaimer, the term of this patent is extended or adjusted under 35 U.S.C. 154(b) by 432 days.

(21) Appl. No.: 13/034,497

(22) Filed: Feb. 24, 2011

(51) Int. Cl.
*H04L 1/00* (2006.01)

(52) U.S. Cl.
USPC .................. 370/230.1; 370/300; 370/429

(58) Field of Classification Search
USPC .......................................... 370/230, 300, 429
See application file for complete search history.

(56) References Cited

U.S. PATENT DOCUMENTS

| | | | |
|---|---|---|---|
| 6,151,307 A | 11/2000 | Gauthier et al. | |
| 6,324,087 B1 | 11/2001 | Pereira | |
| 6,763,425 B1 | 7/2004 | Pereira | |
| 7,243,177 B1 | 7/2007 | Davis et al. | |
| 7,289,442 B1 | 10/2007 | Srinivasan et al. | 370/230 |
| 7,342,886 B1 | 3/2008 | Srinivasan et al. | 370/235 |
| 7,346,000 B1 | 3/2008 | Srinivasan et al. | 370/235 |
| 7,349,332 B1 | 3/2008 | Srinivasan et al. | 370/229 |
| 8,031,503 B1 | 10/2011 | Gyllenhammer et al. | |
| 8,413,006 B1 | 4/2013 | Mok et al. | |
| 8,467,213 B1 | 6/2013 | Channabasappa | |
| 2003/0196132 A1 | 10/2003 | Chiang | |
| 2008/0123781 A1* | 5/2008 | Pisek et al. | 375/340 |
| 2008/0279567 A1* | 11/2008 | Huang et al. | 398/168 |

OTHER PUBLICATIONS

U.S. Appl. No. 13/034,570, filed Feb. 24, 2011, entitled "Serial Link Interface Power Control Method And Apparatus With Selective Idle Data Discard".

* cited by examiner

*Primary Examiner* — Wanda Z Russell
(74) *Attorney, Agent, or Firm* — Sterne, Kessler, Goldstein & Fox P.L.L.C.

(57) ABSTRACT

An integrated circuit is disclosed. The integrated circuit includes a receive port interface to receive request data at a first data rate from a first host and a transmit port interface. The transmit port interface to transmit response data words across plural serial lanes to a second host at a second data rate. The second data rate is less than a predefined line rate of symbol transfers across the plural serial lanes. The transmit port interface includes shaping logic to transmit a data word stream at the second data rate and selectively insert idle words into the data word stream such that the data words and the idle words are together transferred at the predefined line rate.

20 Claims, 5 Drawing Sheets

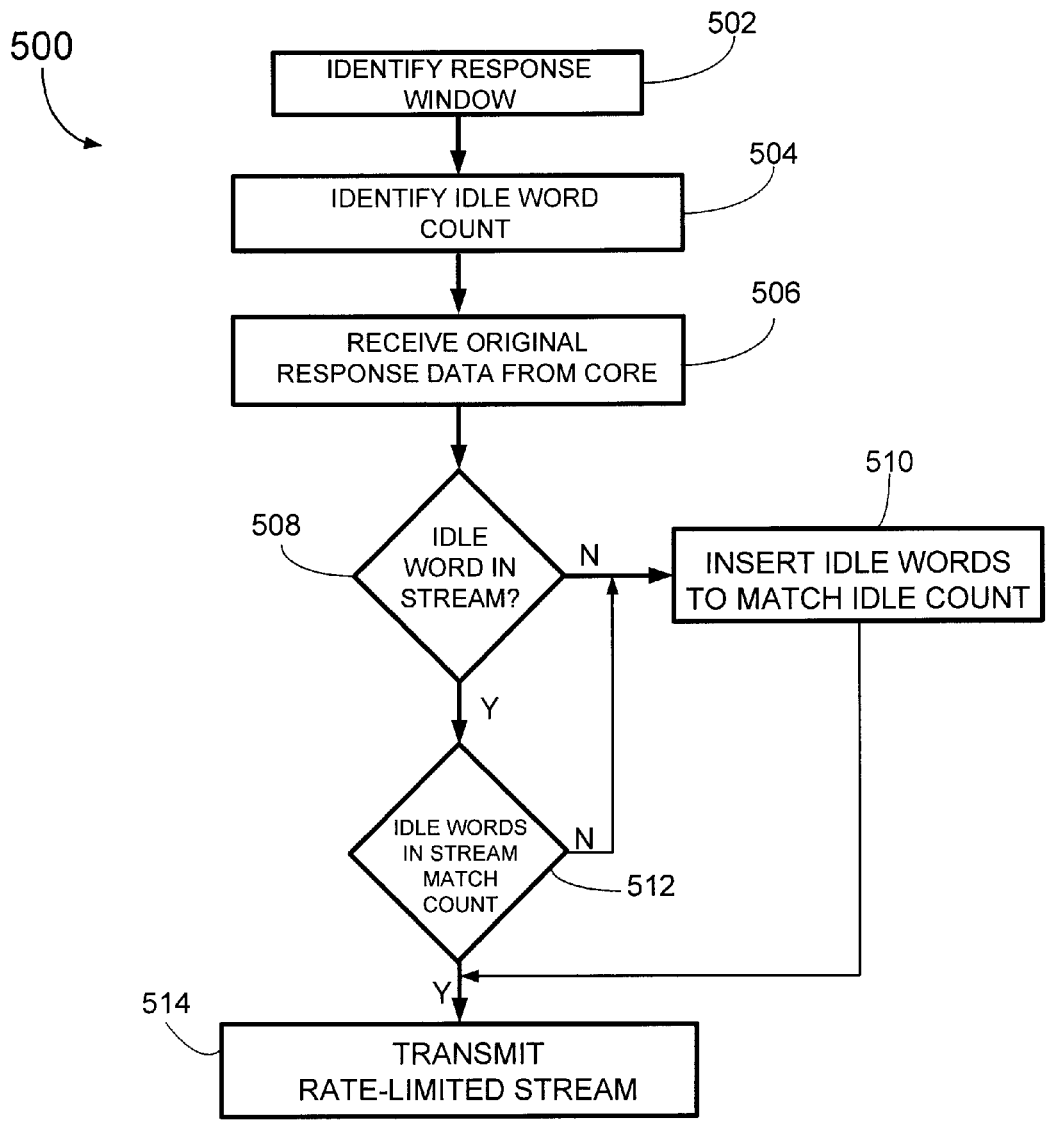

NETWORK PROCESSOR WITH TRAFFIC SHAPING RESPONSE BUS INTERFACE

TECHNICAL FIELD

This disclosure relates generally to network processor interfaces, and more particularly to methods and associated apparatus for controlling data rates across a transmit interface through programmable idle insertion operations.

BACKGROUND OF RELATED ART

Network processors are employed in a variety of applications to manage traffic within network devices such as switches and/or routers. Data traffic typically flows between interconnected processors via request (receive) and response (transmit) interfaces. Each processor typically includes core circuitry that operates at a core rate to process requests and responses and sufficient buffer circuitry to temporarily store data received via various transfer rates.

A problem often encountered by network processors involves peak data reception and/or transfer, where the processor core may be unable to keep up with the rate of incoming data traffic from an upstream device. In such circumstances, the buffer circuitry plays a pivotal role in temporarily storing the data, thereby preventing packets from being lost (resulting in retransfers, etc.). Unfortunately, network processor buffers are of limited size to conserve integrated circuit real estate.

One solution to the buffer overflow problem involves slowing the data rate from upstream devices until the core circuitry can catch up. This is generally referred to as "traffic shaping." In some instances, flow control information may accompany the data to help in allowing multiple network processors to manage variable data transfer rates. However, many modern high-speed networks require coded symbol transfers at fixed line rates in order to satisfy edge transition density requirements.

Thus, the need exists for traffic management methods and apparatus that maintain predefined line rates while minimizing the risk of buffer overflows.

BRIEF DESCRIPTION OF THE DRAWINGS

The present embodiments are illustrated by way of example and are not intended to be limited by the figures of the accompanying drawings, where:

FIG. 5 illustrates a flowchart setting forth steps in operating the network processor of FIG. 1.

Like Reference Numerals Refer to Corresponding Parts Throughout the drawing figures.

DETAILED DESCRIPTION

Figure 1:
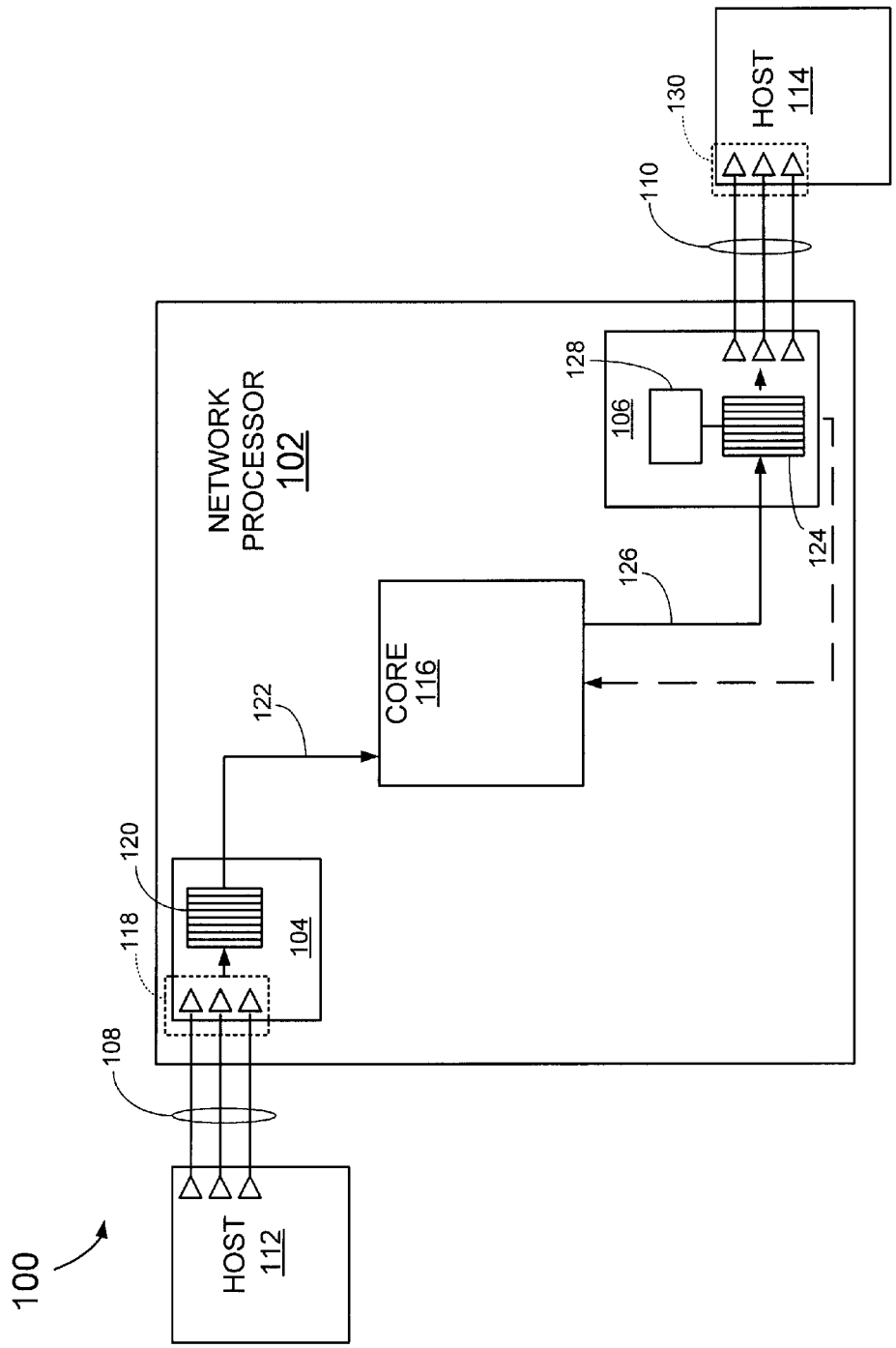
FIG. 1 illustrates one embodiment of a network processor system having a network processor coupled to a plurality of hosts.

In the following description, numerous specific details are set forth such as examples of specific components, circuits, and processes to provide a thorough understanding of the present embodiments. In the following description, for purposes of explanation, specific nomenclature is set forth to provide a thorough understanding of the present embodiments. However, it will be apparent to one skilled in the art that these specific details may not be required to practice present embodiments. In other instances, well-known circuits and devices are shown in block diagram form to avoid obscuring the present embodiments unnecessarily. It should be noted that the steps and operation discussed herein (e.g., the loading of registers) can be performed either synchronously or asynchronously. The term "coupled" as used herein means connected directly to or connected through one or more intervening components or circuits. Any of the signals provided over various buses described herein may be time multiplexed with other signals and provided over one or more common buses. Additionally, the interconnection between circuit elements or blocks may be shown as buses or as single signal lines. Each of the buses may alternatively be a single signal line, and each of the single signal lines may alternatively be buses. Further, the prefix symbol "/" or the suffix "B" attached to signal names indicates that the signal is an active low signal. Each of the active low signals may be changed to active high signals as generally known in the art.

An integrated circuit is disclosed. The integrated circuit includes a receive port interface to receive request data at a first data rate from a first host and a transmit port interface. The transmit port interface transmits response data words across plural serial lanes to a second host at a second data rate. The second data rate is less than a predefined line rate of symbol transfers across the plural serial lanes. The transmit port interface includes shaping logic to transmit a data word stream at the second data rate and selectively insert idle words into the data word stream such that the data words and the idle words are together transferred at the predefined line rate. By selectively inserting idle words into a data word stream in this manner, a maximum transmit data rate may be established to minimize the risk of overflowing data buffer circuitry in the second host, yet maintain the line rate to provide sufficient edge density for optimal operation of the high-speed serial lanes.

In one embodiment, a method of operation in an integrated circuit is disclosed. The method includes receiving request data words from a first host at a first data rate; establishing a line rate for transmitting symbols to a second host; and transmitting response data words defining a data word stream to a second host at a second data rate and idle words at an idle rate. The second data rate and the idle rate together correspond to the line rate.

In a further embodiment, a system is disclosed that includes a first host for generating request data at a first data rate and a second host. A network processor is coupled to the first host via a request bus and coupled to the second host via a response bus. The network processor includes a response interface to transmit output symbols at a line rate and response data words to the second host at a second data rate. The transmit interface includes shaping logic to transmit data words at the second data rate and selectively insert idle words into the data word stream at a predefined idle word rate.

FIG. 1 shows one embodiment of a network processor system, generally designated 100, that employs a network processor 102 having respective request (receive) and response (transmit) interfaces 104 and 106 coupled to respective request and response busses 108 and 110. Each bus comprises a set of serial links or lanes that together provide an aggregate data rate. Respective hosts 112 and 114 couple to the network processor 102 via the request and response busses. The hosts may form respective portions of a common circuit, or be embodied as distinct integrated circuits, such as other network processors, that cooperate to manage traffic throughout the system 100.

In one embodiment, an Interlaken serial protocol ("Interlaken") is employed for communicating data and control information between the network processor 102 and each of the hosts 112 and 114. Interlaken enables the use of a configurable number of lanes in the request and response buses to establish a desired overall data rate between the chips, and provides a correspondingly scalable serial interface. Interlaken's data transmission format involves segmenting the data into bursts to generate data words. Control words that have a similar packet structure to the data words are inserted at the beginning and end of each data burst, and sub-fields within the control words may affect either the data following or preceding them. Segmenting bursts enables the interface to, if desired, interleave data transmissions from different channels or links to minimize latency. Although the examples described herein focus on use of the Interlaken protocol, many other serial protocols provide similar data and control word structures and may benefit from application of the methods and apparatus described herein.

Each of the serial links employed in the request and response buses between the hosts 112 and 114 and the network processor 102 generally include a differential pair of conductors for propagating differential signals or symbols. The paths may be implemented on printed circuit board substrates, such as FR4, backplanes, or via suitable cables. Symbols propagate on the links at a predefined line rate in a manner that meets any edge transition density requirements for the signaling protocol. To generate and receive the symbols, each link is bounded by respective transmitter and receiver link partners. The edge density requirements enable the serial links to maintain signal tracking capabilities to ensure high-speed operation in a variety of conditions. Symbols transmitted at the symbol rate may include data words, control words, or idle words, while the use of the term data rate used herein refers to the transmission rate of data words only, or a combination of data words and control words (generally excluding idle words).

With continued reference to FIG. 1, the network processor 102 may include a programmable logic device having a programmable logic core 116 to allow for configurability of the receive and transmit interfaces 104 and 106. The receive interface 104 includes a receive port 118 having receiver and processing circuitry to carry out, various functions such as decoding and deserialization of request data. The request data is generally in the form of data and control words consistent with the Interlaken protocol. Buffer circuitry 120 in the form of a FIFO, for example, provides temporary storage in the event peak data reception exceeds the processing rate of the core 116. Data words are received at the receive interface 104 at a predefined maximum data rate and appropriately queued at the buffer 120 prior to being forwarded for processing in the core 116. In one embodiment, described more fully in U.S. patent application Ser. No. 13/034,570, filed Feb. 24, 2011, titled "Serial Link Interface Power Control Method and Apparatus with Selective Idle Data Discard", assigned to the assignee of the present disclosure, and expressly incorporated by reference herein, idle words transmitted with data words that are received from the request bus are selectively inhibited from being forwarded to the request buffer circuitry to minimize power dissipation in the receive interface 104. A processor data bus 122 routes request data to the core for processing and generating appropriate response data.

At the response side of the network processor 102, the transmit interface 106 includes a transmit data buffer 124 coupled to the core 116 via an output data bus 126 and shaping logic 128. The shaping logic 128 controls response bus data word transmit rates while maintaining a fixed transmit line rate. The shaping logic 128 responds to programmed values to establish an idle word transmission rate that cooperates with the predefined line rate to effectively set a maximum transmit data rate. As more fully explained below, during peak periods of transmit data traffic, data word transmissions along the response bus 110 may be selectively paused (because of one or more idle word insertions into the data stream) to inhibit data word transmission rates above a programmed threshold. This provides an effective way to prevent lost packets due to data buffer overflows at a request interface 130 of the second host 114.

In some embodiments, the status of the transmit FIFO 124 may be communicated to the core 116 to vary the rate at which data is fed to the FIFO along the output bus 126. Thus, when the FIFO is close to filling, the core can be alerted to slow the flow of response data from the core, and assist the FIFO in freeing buffering resources. In a similar way, flow control information received by the second host 114 may be communicated to the first host 112 to cause a variance in the request data traffic fed to the network processor request interface 104. The overall systematic rate control scheme minimizes lost packets from FIFO 124 overflows while maintaining the high-speed features provided by the serial link interfaces.

Figure 2:
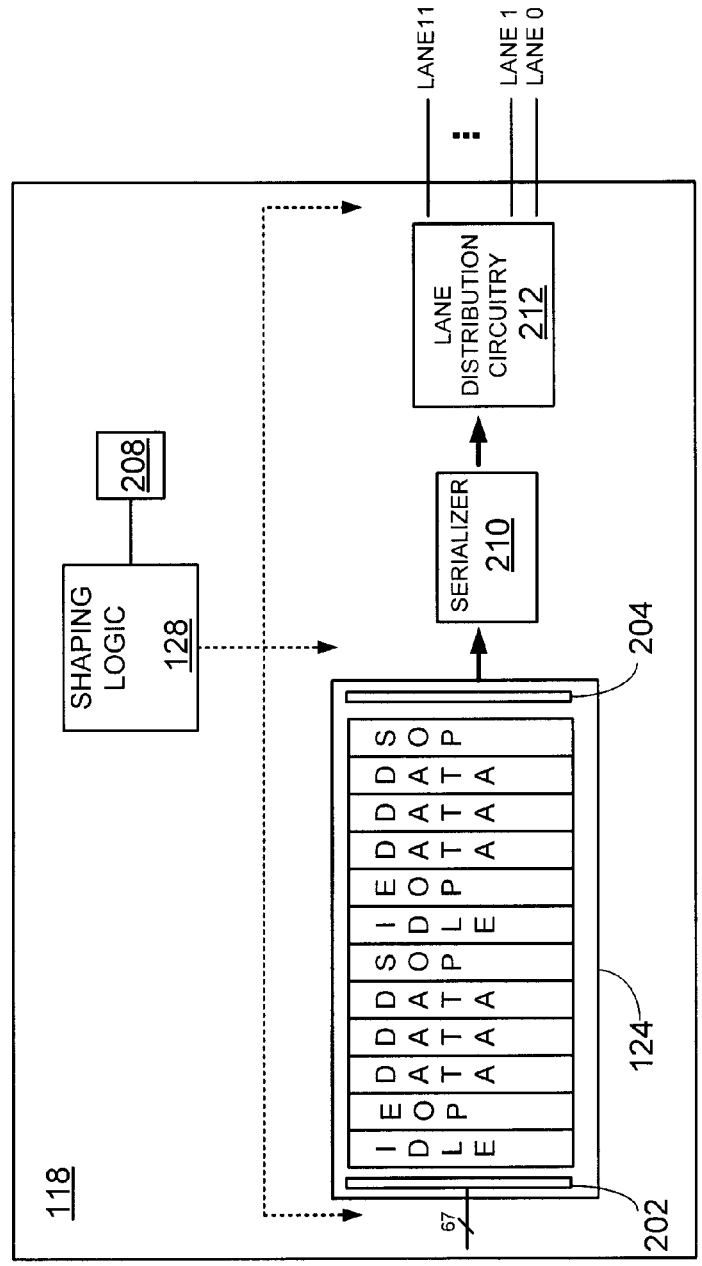
FIG. 2 illustrates one embodiment of a transmit interface for use in the network processor of FIG. 1.

Referring now to FIG. 2, the data buffer 124 preferably includes a first-in-first-out (FIFO) circuit that provides a write data interface 202 to sequentially load parallel data words in response to a system clock signal, and a read data interface 204 to read out the oldest data words for serialization and distribution to the response bus 110. As explained above, the overall function of the data buffer includes, among other things, temporarily storing the received data words as a queue for subsequent transmission via the response bus 110. The size of the data buffer may be based on several criteria, including the level of expected data traffic, the available area on-chip, the speed of the chip core, and other similar factors.

For embodiments involving the Interlaken protocol, data words loaded into the transmit FIFO 124 are bounded at each end by respective "Start-of-Packet" (SOP) and "End-of-packet" (EOP) control words. This is shown in the data buffer by noting the contents of the first five FIFO locations— "SOP", "DATA", "DATA", "DATA", and "EOP." An SOP is always a burst control word (a burst control word will always contain the SOP of the next packet and the EOP of the previous packet). An EOP may be a burst control word or an idle control word. Where there is no further data payload to be sent from a device, the last EOP goes out as an idle control word with an EOP bit set. Additional idle control words, however, provide little-to-no data value and do not contribute to data word data rates. However, idle control words do provide edge transitions, and thus contribute to the transmit line rate. By programmatically inserting idle words into a data word stream, a maximum data word transmission rate may be established with little to no impact to the transmit line rate. This preserves line rate edge transition density requirements over the serial links while providing additional reliability for the network by minimizing the risk of lost packets due to data buffer overflows.

Further referring to FIG. 2, idle word insertion may be carried out in one embodiment by idle insertion operations performed by the shaping logic 128 to respond to programmed values loaded, for example, in register circuitry 208 via a suitable application programming interface (API). Additional circuitry in the transmit interface includes serializer circuitry 210 to convert parallel data words from the FIFO to serial data words, and lane distribution circuitry 212 to, for example, distribute the data words among the plurality of lanes to the response bus 110. Idle words may be inserted into a response data word stream at various access points (shown in phantom) such as the input to the data FIFO, the output of the data FIFO, or the input or output of the lane distribution circuitry.

In one embodiment, programming the idle word rate involves defining at least two values. The first value defines a "response window" size, which generally defines a fixed number of adjacent words for transmission across the available transmit serial links. The second value defines a minimum number of idle words that must be inserted (or included) in the defined "response window." The result is a rate-limiting of the transmitted data words within the defined response window. The ratio of idle words to response window words generally corresponds to the ratio of the line rate from the transmit interface 106 to the data rate for the second host request interface 130. Practically speaking, should the host 114 have a maximum request data rate of 5 GB/s, for example, and the network processor response bus has a maximum transmit rate of 6 Gb/s, unless a maximum data rate of 5 Gb/s is established on the response bus, the host data FIFO may be at risk of overflowing during peak data transmissions. By programming the response word size and idle count into the shaping logic 128, this risk may be minimized while still maintaining adequate line rate requirements for the serial links.

Figure 3:
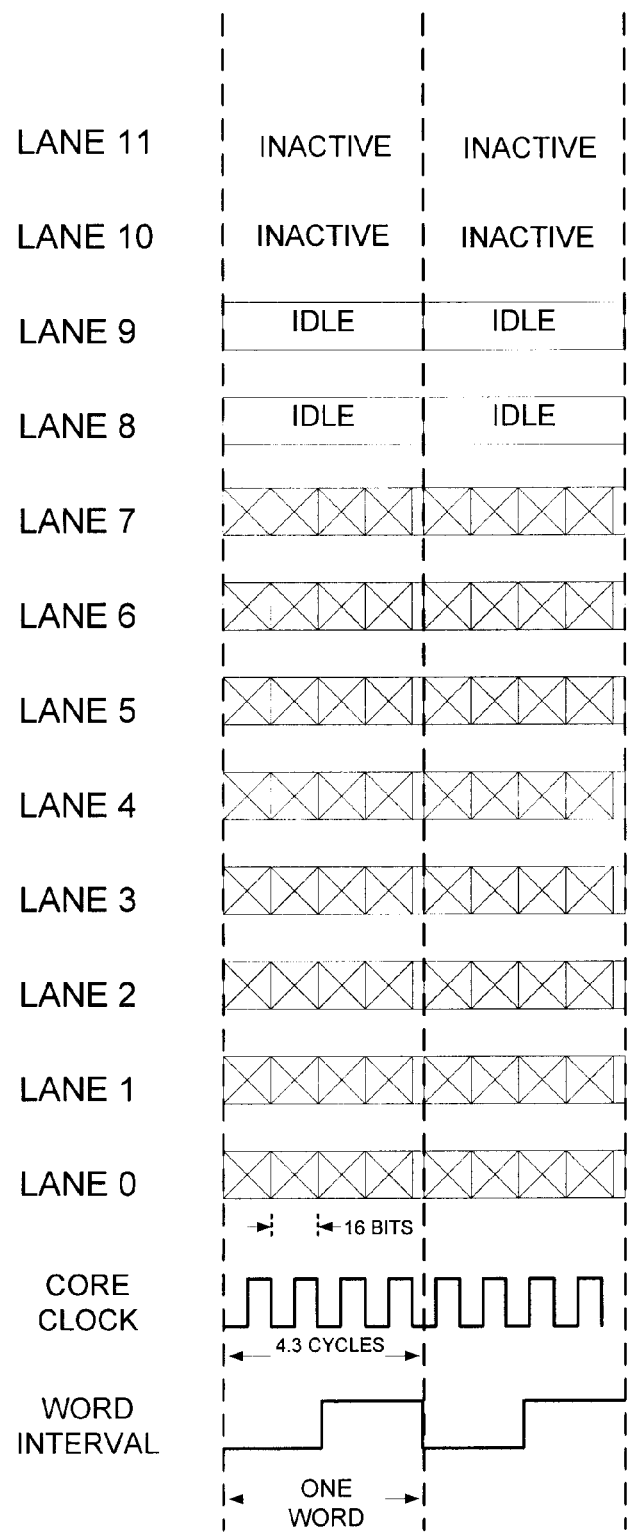
FIG. 3 illustrates a timing diagram with idle and data words output along the transmit interface of FIG. 2.

FIG. 3 illustrates one example of a configuration of transmit links and packet word transmissions over two transmission cycles or word intervals. The transmit interface includes twelve serial lanes, Lanes 0-11, enabling a maximum transfer of twelve words onto the serial links in parallel during each word interval. For embodiments utilizing the Interlaken protocol, each word includes sixty-seven bits organized into various fields. Data words include eight bytes of data (sixty-four bits), with three sync bits. Two bytes of data (16-bits) are output from the core each core clock cycle, such that an entire word may be sent every 4.3 cycles of the core clock. Control words and idle words include no data bits, but have a similar overall frame structure, including flow control information.

As shown in FIG. 3, each word sequentially output from the transmit FIFO 124 is steered to a different lane, beginning with Lane 0, until all the lanes are loaded for a given transmit interval (word interval). Idle words are inserted by the shaping logic 128 in accordance with the programmed idle word count value and response window size value. In the example of FIG. 3, the response word size is nine, with an idle count of two. In some embodiments, one or more lanes may be deactivated to cooperate with idle insertions to further shape the data rate of response data words transmitted to the host 114.

Figure 4A:
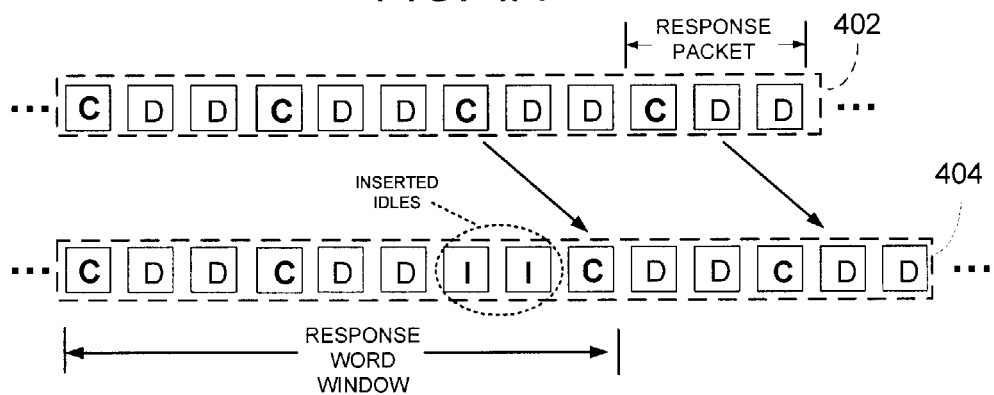
FIG. 4 illustrates examples of original and rate-limited packet streams generated in accordance with the teachings herein.
Figure 4B:
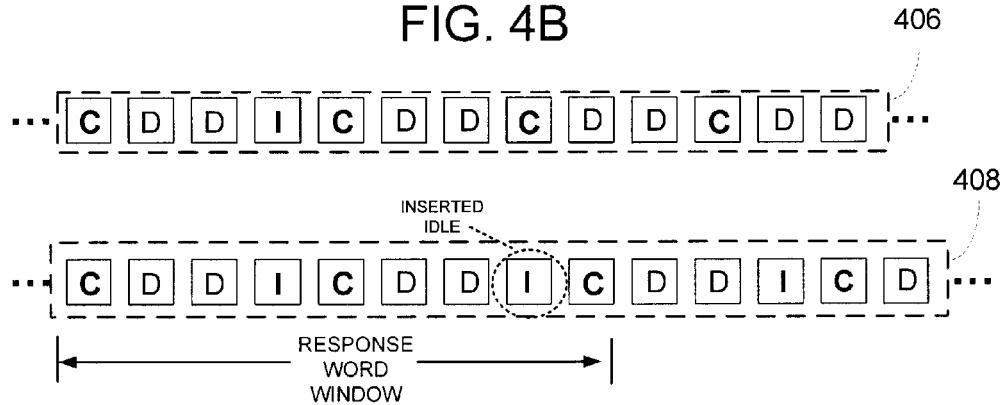
Figure 4C:
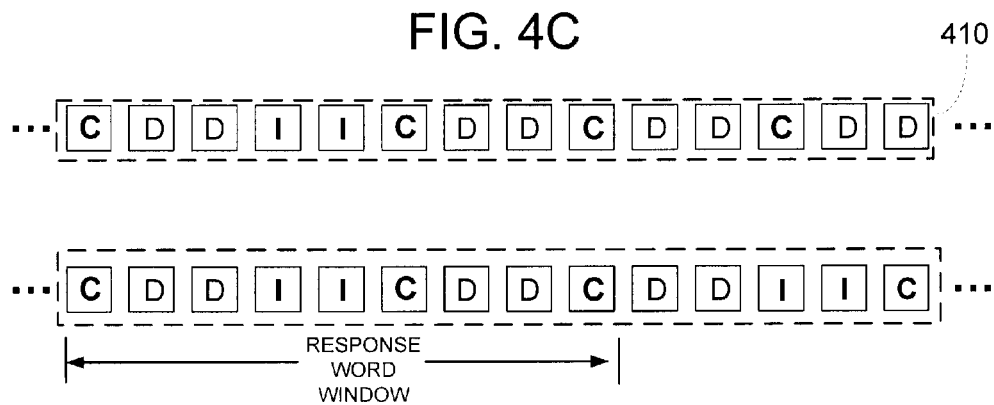

FIGS. 4A-4C illustrate examples of rate-limited packet streams resulting from various implementations of interspersed idle words. In all of the examples, the response window value is programmed to represent nine words, and the idle count programmed to represent two idle words. FIG. 4A illustrates a scenario where an original data word packet stream 402 includes only data words "D" and control words "C" (such as SOP and EOP words), and no idle words. The result of the programming causes the shaping logic 128 to forcibly insert two idle words "I" within the nine-word response word window in the rate-limited word stream 404. In terms of data rate, instead of having nine response data and control words in the nine word window, the resulting data word stream includes only seven data words, resulting in a corresponding reduction in the transmit data rate while maintaining the line rate for the transmitted data, control, and idle word symbols. In one embodiment, idle words are inserted only between complete response packets. In FIG. 4A, each complete response packet is indicated by a control word "C" followed by data words "D". For the example given in FIG. 4A, both idle words may be inserted between two adjacent response packets, or spread out such that one idle word is inserted between a first pair of packets, and a second idle word inserted between a second pair of packets.

FIG. 4B illustrates a situation where an idle control word is already present in an original data word stream 406. Again, with an idle count of two and a response window size of nine, since an idle word is already present in the window, only one idle word needs to be inserted into the word stream by the shaping logic 128. The resulting rate-limited word stream is shown at 408. FIG. 4C shows a situation where multiple idle words are already present in an original data word stream 410. Since the programmed idle count of two is already satisfied, no additional idle words need to be inserted into the response window.

In operation, the network processor transmit interface 106 carries out steps in accordance with a method, generally designated 500, and shown by the flowchart of FIG. 5. The method begins, at step 502, with identifying a defined response word window programmed into the register circuitry 208 by a programmer. An idle word count is also identified, at step 504, to establish the desired rate-limiting ratio of idle words to the defined word stream window. Original response data is then received from the network processor core 116, at step 506, and evaluated, at step 508, to determine whether idle words are present in the stream. If no idle words are present in a given response word window, then the shaping logic 128 forcibly inserts a number of idle words matching the programmed idle count value, at step 510. The resulting data word stream, including the forcibly inserted idle words, is then transmitted to the host 114 at the effectively reduced data rate, at step 514.

Further referring to FIG. 5, If the determination at step 508 indicates that idles are present in the original data word stream, then a second determination is made, at step 512, as to the number of idle words in the stream. If the number of idles is less than the programmed idle count, then sufficient idle words are inserted by the shaping logic, at 510, until a resulting data stream response window is generated with the requisite idles. Should the original idle words match or exceed the idle count value, then no additional idle words are inserted, and the original data word stream is transmitted to the host, at 514. In one embodiment, the two determinations at steps 508 and 512 may be combined as a single evaluation to detect and ensure that a number of idle words at least the value of the idle count are present in the response data word stream.

Those skilled in the art will appreciate the many benefits and advantages afforded by the embodiments described herein. For example, by including shaping logic 128 within the transmit interface 106, the network processor 102 enables a straightforward way to establish a maximum data rate for data transfers from the network processor to the host 114. Rate-shaping may thus be provided while still maintaining a requisite line rate for high-speed serial links.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A network processor, comprising:
a receive interface configured to:
receive request data at a first data rate; and
a transmit interface configured to:
transmit response data across a plurality of serial lanes to a host at a second data rate, the second data rate being less than or equal to a line rate for transmitting the response data across the plurality of serial lanes, wherein the transmit interface comprises:
shaping logic configured to:
determine a response word window for the response data,
determine an idle word count in the response data within the response word window, and
selectively insert idle words within the response word window based on the determined idle word count such that data words within the response word window and the idle words are together transmitted at the line rate.

2. The network processor of claim 1, wherein the shaping logic is configured to:
insert the idle words at a programmed idle word insertion rate.

3. The network processor of claim 2, wherein the shaping logic includes register circuitry configured to:
store a value indicative of the programmed idle word insertion rate.

4. The network processor of claim 3, wherein the programmed idle word insertion rate is determined by:
a first value representing the response word window, and
a second value representing a number of the idle words to insert within respective response word windows.

5. The network processor of claim 1, wherein the first data rate is based on the second data rate.

6. The network processor of claim 1, wherein the second data rate is a maximum data rate.

7. The network processor of claim 6, wherein the maximum data rate is based on a data rate supportable by the host.

8. A method, comprising:
receiving an output data stream;
determining a line rate for transmitting the output data stream to a host device;
determining a response word window for the output data stream;
determining, an idle word count in the output data stream within the response word window;
inserting idle words within the response word window based on the determined idle word count such that data words within the response word window and the idle words are together transmitted at the line rate; and
transmitting the output data stream to the host device.

9. The method of claim 8, wherein inserting the idle words comprises:
inserting the idle words to maintain the line rate while transmitting the data words at a second data rate.

10. The method of claim 8, further comprising:
establishing a predetermined data word window size for the response word window; and
ensuring that a minimum number of the idle words are inserted within respective response word windows of the output data stream.

11. The method of claim 8, wherein the response word window comprises a complete response packet.

12. A network processor, comprising:
a processor;
a receive interface coupled to the processor; and
a transmit interface coupled to the processor, the transmit interface comprising:
a transmit data buffer configured to:
output a data stream, and
shaping logic configured to:
determine a response word window for the data stream,
determine a number of idle words to be included within the response word window,
determine an idle word count in data within the response word window, and
initiate an insertion of an amount of the idle words within the response word window based on the determined number of the idle words and the determined idle word count.

13. The network processor of claim 12, wherein the processor is configured to:
modify a receive rate of the receive interface based on a processing rate of the processor.

14. The network processor of claim 12, wherein the transmit interface is configured to:
communicate a status of the transmit data buffer to the processor.

15. The network processor of claim 14, wherein the processor is configured to:
modify a rate at which data is transmitted to the transmit data buffer in response to receiving the status.

16. The network processor of claim 12, wherein the transmit interface further comprises:
a register configured to store the number of the idle words to be inserted within the response word window.

17. The network processor of claim 12, wherein the shaping logic is further configured to:
determine a size of the response word window.

18. The network processor of claim 12, wherein the number of the idle words to be included within the response word window determines a minimum number of the idle words to be included within the response word window.

19. The network processor of claim 12, wherein the number of the idle words to be included within the response word window is based on a ratio of a line rate from the transmit interface to a data rate of a host that receives data via the transmit interface.

20. The network processor of claim 12, wherein the transmit data buffer is configured to:
sequentially output each word of the data stream into a different data lane until all data lanes are loaded for a given transmit interval.

* * * * *